July 15, 1958 E. M. BROHL 2,843,802
TELL-TALE CIRCUIT
Filed Sept. 1, 1955
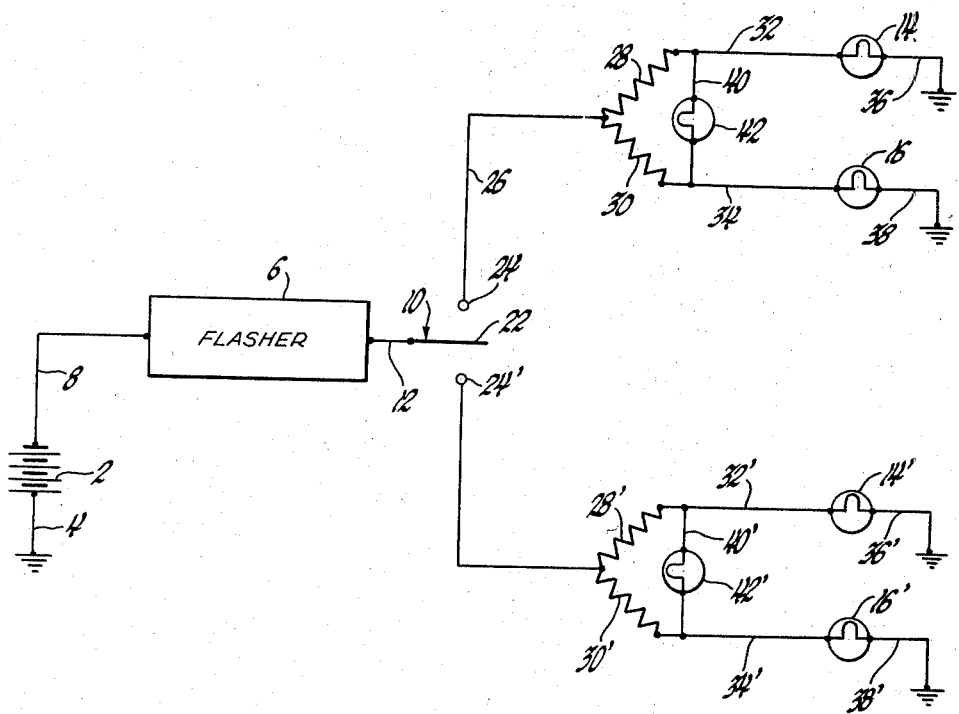
Inventor
Earl M. Brohl
By Paul Fitzpatrick
Attorney

2,843,802

TELL-TALE CIRCUIT

Earl M. Brohl, Flint, Mich., assignor to General Motors Corporation, Detroit, Mich., a corporation of Delaware Application September 1, 1955, Serial No. 531,967

3 Claims. (Cl. 315—83)

This invention relates to tell-tale indicators for illuminating systems and particularly, although not exclusively, to a tell-tale circuit for automotive direction signaling systems.

One of the prime requisites of all automotive safety features is reliability of operation. This is particularly true with respect to signaling devices, since the majority of vehicle operators tend to rely greatly on the visual signals given by other operators. Direction signal systems for motor vehicles represent one of the most widely utilized safety features in the present day automotive vehicles. While virtually all such systems embody some form of tell-tale device to indicate malfunctions or failure of a system, in the majority of cases, indication of malfunction or failure is impositive or requires an unusual degree of perception. By way of example, a typical installation utilizes pilot lamps which flash concurrently with the direction indicating lamps, malfunction being indicated by an increase or decrease in the periodicity of flashing of the pilot lamp. In practice it has been found that this and other common forms of tell-tale signals are in varying degrees ineffective due to the failure of the operator to recognize the change in periodicity or even recognize that such change indicates a malfunction.

An object of the present invention is to provide a direction signaling system incorporating tell-tale indicators providing positive, easily recognizable indication of a system failure.

Another object is to provide a system of the type referred to which permits ready identification of the source of malfunction.

Still another object is to provide a system of the type referred to wherein the tell-tale device requires no moving parts.

A further object is to provide a direction signal circuit incorporating tell-tale indicators which are entirely electrical in operation.

An important feature of the invention is that the tell-tale lamps in the circuit function only when one of the lamps of the signaling system has become inoperative. The normal current draw of the entire system is substantially reduced, thereby decreasing the average electric load on the battery.

These and other objects and advantages of the invention will become more fully apparent as reference is had to the accompanying specification and drawings wherein:

The single figure is a schematic view illustrating a typical direction signal system incorporating the tell-tale circuit arrangement of the present invention.

In the embodiment illustrated in the drawing, the reference numeral 2 indicates generally a source of current such as a battery. Battery 2 is connected to ground by lead wire 4. Extending between the battery 2 and a flasher unit 6 is conductor 8. Flasher 6 may be of any desired construction capable of providing intermittent energization of the circuit. Reference numeral 10 indicates generally a direction signal switch mechanism which is connected to flasher 6 by means of a conductor 12. In the embodiment shown, switch 10 takes the form of a double throw single pole switch which is effective to energize either of a pair of signaling lamps 14 and 16 or 14' and 16' upon movement in opposite directions from its central neutral position. It will be understood, however, that the precise form of switch 10 is for illustrative purposes only. In practice, all known types of direction signal switches and operating mechanisms therefor may be utilized in connection with the present invention. As seen in the drawing, switch 10 includes a swingable bridging member 22 which is selectively movable to engage either fixed contact 24 or 24' which are spaced respectively at opposite sides of the normally centered bridging member 22. A conductor 26 is connected at one end to contact 24 and at its opposite end has connected thereto in parallel a pair of matched resistors 28 and 30. Resistors 28 and 30, in turn, connected respectively to conductors 32 and 34. Conductors 32 and 34, in turn, are connected to indicator lamps 14 and 16 which are, in turn, connected to ground by lead wires 36 and 38. Extending between lead wires 32 and 34 is a bridging conductor 40 which has inserted therein an indicator or telltale lamp 42. In order that the invention may be more fully understood, a description of the operation follows: When swingable contact member 22 is moved to engage contact 24, the circuit between the battery 2 and lamps 14 and 16 is closed and current flows through conductor 8, flasher 6, conductor 12 and conductor 26. At the juncture of conductor 26 with matched resistors 28 and 30, the current flow is divided equally and passes respectively through conductors 32 and 34 to signaling lamps 14 and 16, respectively. Because of the load imposed on the flasher mechanism 6, the circuit is intermittently broken, thereby causing lamps 14 and 16 to be illuminated intermittently in conventional manner. As long as both lamps 14 and 16 are functioning properly, the load on each conductor 32 and 34 is equal and no current passes through bridging conductor 40. Consequently, tell-tale lamp 42 receives no electrical energy. However, failure of either lamp 14 or 16 disturbs the balance normally existing between conductors 32 and 34 and results in current flow through the bridging conductor 40 which causes illumination of lamp 42. Therefore, failure of either lamp 14 or 16 is instantly and positively indicated by the illumination of tell-tale lamp 42. In a practical application, it has been found that satisfactory performance is achieved with a circuit of the type described utilizing matched ½ ohm resistors in conjunction with signaling lamps using 5 amperes each and a 50 milliampere telltale lamp. Under such circumstances 1.75 volts would be supplied to the tell-tale lamp when signaling lamp failure occurred. It will be understood that the operation of the circuit leading to lamps 14' and 16' is identical to that just described, when bridging member 22 is moved to engage contact 24'.

In practice, the indicator lamps are preferably arranged so that lamps 14 and 16 are disposed respectively at the front and rear of the vehicle at one side thereof, while lamps 14' and 16' are disposed at the front and rear at the opposite side of the vehicle. With the indicator lamps arranged in this manner, the tell-tale lamps 42 and 42', respectively, are preferably disposed in correlated positions relative to the side of the vehicle on which their respective signaling lamps are located. As a result, both the existence and location of any malfunction will then be readily evident to the operator.

While the invention has been shown and described in connection with a direction signaling system, it will be understood that it is equally adaptable for incorporation in any illuminating system as for instance in connection with the vehicle headlights.

While but one embodiment of the invention has been shown and described, numerous changes and modifications will occur to those skilled in the art. It is, therefore, to be understood that it is not intended to limit the invention to the embodiment shown, but only by the scope of the claims which follow:

I claim:

1. A lamp circuit comprising a source of current, a primary circuit, a pair of branch circuits connected in parallel to said primary circuit, each branch comprising a resistance and a primary lamp in series, a tell-tale lamp connected to said branches between the resistance and lamp in each branch, said lamp circuit being effective to illuminate said tell-tale lamp upon failure of either of said primary lamps, and a switch in said primary circuit for selectively energizing and deenergizing said branch circuits.

2. A lamp circuit comprising a source of current, a primary circuit connected to said source of current, a flasher mechanism connected to said primary circuit for automatically making and breaking the circuit intermittently, a pair of branch circuits connected in parallel to said flasher, each branch comprising a resistance and a primary lamp in series, and a tell-tale lamp connected to said branches between the resistance and lamp in each circuit, said lamp circuit being effective to intermittently illuminate said tell-tale lamp upon failure of either of said primary lamps.

3. A lamp circuit comprising a source of current, a primary circuit, a flasher connected in series with said primary circuit and effective to automatically make and break the continuity thereof intermittently, a plurality of pairs of branch circuits adapted for connection in parallel with said primary circuit, each branch comprising a fixed resistance and a primary lamp in series, a tell-tale device connected to each of said branches between the resistance and lamp in each branch, said circuit being effective to energize one or the other of said tell-tale devices upon failure of either of said primary lamps in one or the other of said branch circuits respectively, and a manually controllable switch connected to said primary circuit between said flasher and said resistances for energizing or deenergizing either of said branch circuits selectively.

References Cited in the file of this patent
UNITED STATES PATENTS

| | | |
|---|---|---|
| 2,071,911 | Young | Feb. 23, 1937 |
| 2,118,483 | Woodman | May 24, 1938 |
| 2,659,787 | Prickett | Nov. 17, 1953 |